United States Patent
Nobelen

(10) Patent No.: US 9,849,997 B2
(45) Date of Patent: Dec. 26, 2017

(54) METHOD FOR SYNCHRONISING THE ENGINES OF AN AIRPLANE WITH DUAL INTERMEDIATE STATE

(71) Applicant: Safran Aircraft Engines, Paris (FR)

(72) Inventor: Florent Nobelen, Moissy-Cramayel (FR)

(73) Assignee: Safan Aircraft Engines, Paris (FR)

(*) Notice: Subject to any disclaimer, the term of this patent is extended or adjusted under 35 U.S.C. 154(b) by 0 days.

(21) Appl. No.: 15/304,008

(22) PCT Filed: Apr. 15, 2015

(86) PCT No.: PCT/FR2015/051027
§ 371 (c)(1),
(2) Date: Oct. 13, 2016

(87) PCT Pub. No.: WO2015/159027
PCT Pub. Date: Oct. 22, 2015

(65) Prior Publication Data
US 2017/0036774 A1    Feb. 9, 2017

(30) Foreign Application Priority Data
Apr. 15, 2014 (FR) .................................... 14 53373

(51) Int. Cl.
*B64D 31/12*    (2006.01)
*F02C 9/42*    (2006.01)
(Continued)

(52) U.S. Cl.
CPC .............. *B64D 31/12* (2013.01); *F01D 21/14* (2013.01); *F02C 9/16* (2013.01); *F02C 9/42* (2013.01);
(Continued)

(58) Field of Classification Search
None
See application file for complete search history.

(56) References Cited

U.S. PATENT DOCUMENTS 9,415,877 B2 * 8/2016 Nobelen ............... B64D 31/12

FOREIGN PATENT DOCUMENTS

GB          2 225 134 A     5/1990
WO   WO 2013/034839 A1    3/2013

* cited by examiner

*Primary Examiner* — Thomas G Black
*Assistant Examiner* — Demetra Smith-Stewart
(74) *Attorney, Agent, or Firm* — Blank Rome LLP

(57) ABSTRACT

A method for synchronizing the engines of an airplane according to one activation logic having a deactivated state (20), an armed state (22), and one activated state (16), in which:
the switching (36) of the synchronization from the armed state to the activated state is carried out via a first and then a second successive intermediate state (38, 39) of the activation logic,
every instance of the activation logic switching from the second intermediate state (39) to the activated state involves the following:
taking into consideration, on each engine, the activation state of the synchronization,
and exchanging said data between the engines,
the switching of the activation logic of one of the engines to the activated state requires that the safety and activation conditions of the other engine are all met.
if one of the engines enters the deactivated state, the other engine does so as well; and
for each engine, the switching (36, 42) of the synchronization from the armed state to the first and then to the second intermediate state takes place automatically (Continued)

when a first portion and then a second portion of the safety and/or activation conditions are met.

6 Claims, 6 Drawing Sheets

(51) Int. Cl.
    *F01D 21/14*     (2006.01)
    *F02C 9/16*     (2006.01)

(52) U.S. Cl.
    CPC .. *F05D 2220/323* (2013.01); *F05D 2270/023* (2013.01); *F05D 2270/13* (2013.01); *F05D 2270/301* (2013.01); *F05D 2270/304* (2013.01); *F05D 2270/306* (2013.01)

METHOD FOR SYNCHRONISING THE ENGINES OF AN AIRPLANE WITH DUAL INTERMEDIATE STATE

The present invention relates to a method for synchronizing the engines of an airplane, and in particular the two-spool turbojets of an airplane.

It should be specified that, in this text, engine (de)activation or synchronisation means the (de)activation of the logic controlling same, i.e. the switching from one state to another state, until, for instance in the activated state (16 hereafter), an order of synchronisation of the engines (for example the speed of rotation N1 of their BP spools) results in an adaptation of speed.

The "activation" respectively the "deactivation" of an engine (or synchronisation), means that the difference between the speed of the LP respectively and/or HP spools respectively will be the same, respectively different (if the logic of FIG. 5 is followed).

As a matter of fact, a small discrepancy between the speed of rotation of the engines of an airplane may cause undesirable vibration and acoustic noise. Synchronizing the low pressure (LP) or the high pressure (HP) spools of the two-spool engines of an airplane in order to reduce the vibration felt in the cabin and also to reduce noise, thereby increasing passenger comfort, is known.

Such synchronization function however aims at satisfying comfort requirements only and it must not give rise to risks for the engines or the airplane. Engine synchronization is therefore deactivated if safety conditions are not met, even if the pilot issues a request to activate synchronization and the conditions for activating synchronization are all met. By way of example, such safety conditions are limit values that must not be reached in order to allow synchronization to be activated and maintained. By way of example, these values are minimum and maximum speed values for the rotor of the HP spool in each engine (N2 min, N2max), a maximum static pressure in the combustion chamber of each engine (Ps3max), and lower (risk of thrust lost), and upper (risk of surge) limit values for the dimensioning ratio Q of each engine (Q=fuel flow rate/Ps3max).

The safety conditions cannot however be all checked each time a request for synchronization activation is issued by the pilot since this would be detrimental to the efficiency of the engine, and this is the reason why synchronization cannot be activated upon a simple request from the pilot only, and requires additional conditions to be checked.

Document FR A1 2 639 444 describes a method for synchronizing a slave engine and a master engine on an airplane, with such engines being two-spool turbojets, each comprising a fan rotor and a gas generator rotor. The speed of rotation of the fan or the rotor of the low pressure spool of the slave engine (referred to as N1) and that of the gas generator or the rotor of the high pressure spool of the slave engine (referred to as N2) can be controlled by regulating the rate at which fuel is fed to the engine, by modifying the elevation setting of the vanes of the engine stator, etc.

In this document, the synchronization is activated when the difference between the above-mentioned speeds of the fans ($\Delta N1$) of the two engines becomes less than 100 rpm and it is deactivated when such difference exceeds said value, or when one of the engines stops or stalls, or when one of the signals N1 is not detected, or when the PLA/N2 ratio of the slave engine exceeds a certain limit (where PLA stands for Power Level Angle, corresponding to the position of the controls in the airplane cockpit). The pilot of the airplane is informed that synchronization has been deactivated. Synchronization is automatically reactivated when the difference $\Delta N1$ drops below 100 rpm. This method is entirely automatic and requires no specific order from the pilot of the airplane.

Such synchronization has the drawback of being entirely automatic. As a matter of fact, the engine synchronization is reactivated when all of the conditions are met again, without any specific request from the pilot of the airplane. Such conditions may however entail a risk for the engines or for the airplane (a risk of engine surge or overspeed, for instance) and it may be dangerous to automatically reactivate the engine synchronization. Furthermore, when these conditions entail no risk for the engines or the airplane (case of engines transient speed, for instance), requesting the pilot's confirmation before reactivating synchronization does not seem desirable since this could result in the pilot being distracted and not paying proper attention to possible numerous changes in the results of such conditions (true/false fuel sloshing).

Besides, when the synchronization is automatically activated, the value of the set value for the speed N1 (or N2) of the slave engine aligns with the value of the speed of the master engine and thus departs from its original set value which had been calculated for optimally delivering the required thrust. Because of the engine speed synchronisation, the thrust from this engine is no longer optimum: it is either increased, thereby reducing the lifetime of the engine, or reduced, thereby requiring the pilot to move the controls, which is the same thing. This is a major drawback.

To remedy such drawback, document WO2013/034839 provides for a method for synchronising the engines of an airplane, using at least one activation logic per engine, intended to check the safety and/or activation conditions in order to apply the synchronisation, with each activation logic defining and switching from/to at least a deactivated state, an armed state, and an activated state, with the method comprising, per engine:
- the switching of the activation logic from the deactivated state to the armed state when an activation order is given by the pilot of an airplane;
- the periodical checking of the safety and/or activation conditions relative to said states, in order to define whether said conditions are met or not met,
- the switching of the activation logic from the armed state to the activated state when some of the safety and/or activation conditions are met; and
- the switching of the activation logic from the activated state or the armed state to the deactivated state when a deactivation order is given by the pilot or when some of the safety conditions are not met.

Each activation logic will thus include at least one activation state of the additional synchronization relative to what is provided in FR-A1-2 639 444, wherein the synchronization is either deactivated (OFF mode) or activated (ON mode), with the synchronization also being able to adopt at least an armed state in the OFF mode, in addition to the deactivated state.

However appropriate it may be, this solution does not prevent that only one engine can be activated.

Now, this might affect synchronisation, or even the correct operation of the engines, or even the safety of the flight.

To remedy such problem, the invention provides that:
- the switching of the activation logic from the armed state to the activated state will be carried out via a first and then a second successive intermediate state of the activation logic, for every instance of the activation logic switching from the second intermediate state to the activated state, such data will be exchanged between the engines through an exchange digital link, so that:

the switching of the activation logic to the activated state of one of the engines will require that the safety and activation conditions of the other engine(s) will all be met, and if the activation logic of one of the engines switches to the deactivated state, the activation logic of the other engine(s) will automatically do so as well; and for each engine, the switching of the activation logic from the armed state to the first and then to the second intermediate state will take place automatically when a first portion and then a second portion, different from the first one, of the safety and/or activation conditions are met.

This will of course mean that the state of the synchronisation for each engine will be taken into consideration: activated synchronisation, armed state on one engine, but not on the second one.

When the engines are synchronized, and if one engine has a problem but the activation condition is lost before the failure is detected, the deactivation of the synchronization on the failing engine only will thus be avoided.

It is further recommended that the switching of the activation logic from the second intermediate state to the activated state should automatically take place on one of the engines, if the other engine(s) is/are, in said second intermediate state or in the activated state.

The synchronisation can thus be simultaneously activated on the engines. The switching to such second intermediate state will a priori be transient for the software.

Besides, it is recommended:

that, when the activation logic is in the deactivated state, an activation order should be issued by the pilot to switch the activation logic to the armed state, and/or that the switching from the activation logic of any one of the first intermediate state, second intermediate state and armed state to the deactivated state, should be carried out when a deactivation order is given by the pilot.

Safety is thus optimized.

Besides, it is also recommended, if the periodical checking of the safety and/or activation conditions states:

that said second part of the conditions or the data relating to the activation state of the activation logic of one of the engines sent to the other engine states that its activation logic is in the first intermediate state, whereas the activation logic of the other engine is the activated state, such activation logic also switches to the first intermediate state, and/or that said first portion of the conditions is no longer met for at least one of the engines, whereas the activation logic is in the first intermediate state, said activation logic then switches to the armed state.

It is also recommended that the safety conditions should be different from the activation conditions and should be met to protect the engines and the airplane. Such safety conditions are, for instance: no surging of the engines, no overspeed of the engines, no over- or under-thrust from the engines, no major breakdown of the engines, etc. Such conditions make it possible to prevent a correctly operating engine from having the same behaviour as a failing engine, for instance.

For simple, efficient and safe operating conditions:

the safety conditions will be the conditions which are at least required for the activation logic to switch from the armed state to the first intermediate state, and the activation conditions will be the conditions which are at least required for the activation logic to switch from the first to the second intermediate state, then to be automatically activated, provided the engines are:

in said second intermediate state (<<ready to activate>> condition), in the synchronization state activated ("XSyncState activated" condition).

The conditions for activating synchronization have to be met to optimize the operation of the engines, since synchronization is not adapted to all operating speeds and it may differ, depending on the (HP or LP) type of the synchronized engines speed. Activation conditions are, for instance, a predetermined discrepancy between the speed set values of the LP and/or HP spools of the engines; a predetermined discrepancy between the speed of the LP and/or HP spools of the engines; a predetermined discrepancy between the set value and the measured speed of the LP and/or HP spools of one engine; a cruising, transient, idling speed or different take-off and landing speeds.

In the case where the activation logic is in the armed or activated state, a deactivation order may be given by the pilot. The switching from the activated or armed state to the deactivated state is nevertheless automatic when at least some of the safety conditions are not met.

Two activation or reactivation types thus exist, and one is automatic, and the second one is requested by the pilot of the plane. Automatic reactivation takes place when the activation conditions only have changed (with the safety conditions still being met), and reactivation still has to be confirmed by the pilot when safety conditions have changed (whatever the result of the checking of the activation conditions).

In practice, at least one synchronization activation button is provided in the cockpit, and in particular two buttons are provided when the engines are of the two-spool type (HP and LP spools). The first button is intended to activate synchronization of the LP spools of the engines (N1Sync), and the second button is intended to activate synchronization of the HP spools of the engines (N2Sync). Each button can have two positions, an ON position (e.g. depressed and lighted) and an OFF position (out and not lighted). The pilot cannot request synchronization of both spools simultaneously. If the pilot presses the first button to depress it whereas the second button is already in the depressed position, then the second button is automatically disengaged to return to the out position.

The pilot of the airplane then has to press one of the buttons to request the activation of synchronization, which then switches from the deactivated state to the armed state.

As explained hereabove, synchronization switches from the armed state to the activated state, via the first and then the second successive transient intermediate states when at least some safety and/or activation conditions are met.

The second intermediate state of the activation logic automatically switches to the activated state, provided the other engine(s) is/are in one of said second intermediate state or activated state, with such data having been noted and exchanged. If the pilot presses the button again to cancel the order, the activation logic returns to the deactivated state. The activation logic also switches to the deactivated state when at least some of the safety conditions are not met. The activation logic is then in the deactivated state even though the cockpit button may still be depressed and lighted. The pilot then has to press the button twice; firstly to return it to the out position, and then to the depressed position again to switch the activation logic to the armed state. An order from the pilot is then required for rearming synchronization.

The means for implementing the method of the invention may for instance comprise an electronic chip, wherein at least one of the activation logic, logic gates (AND, OR, NOT, etc.) is encoded, and means for summing, comparing, detecting front edges, conditions, etc.

The conditions for applying and maintaining synchronization may be checked at regular intervals, e.g. once every 30 ms.

It should then be understood that, when the activation logic is in the first or the second intermediate state, it is deactivated.

When the engines are two-spool engines and comprise one low pressure (LP) spool and one high pressure (HP) spool, the conditions for applying the synchronisation of the LP and/or HP spools may, for instance, include one or more of the following conditions:

A1: the difference between the set values for the speeds of the LP or HP rotors of the engines is less than 10%;
A2: no failure has been detected which might affect the correct operation of the engines or which might generate risks for the airplane;
A3: the difference between the measured speeds of the LP or HP rotors of the engines is less than 10%;
A': the difference between the speed set value and the measured speed for each LP or HP rotor is less than 10%;
B: at least one of the engines is idling; and
C: the airplane is flying and is neither taking off nor climbing.

The activation logic may switch from the activated state to the deactivated state when the A1, A2 and possibly A3 conditions (for HP synchronization) are not met. The activation logic may be switched from the activated state to the armed state when the C conditions are not met.

A rising edge logic on pilot's order will thus be preferred, which makes it possible not to arm the activation logic if it has been deactivated and if the above-mentioned cockpit button is still depressed.

The invention will be better understood, and other details, characteristics and advantages thereof will appear upon reading the following description given by way of a non restrictive example while referring to the appended drawings wherein.

Figure 4:
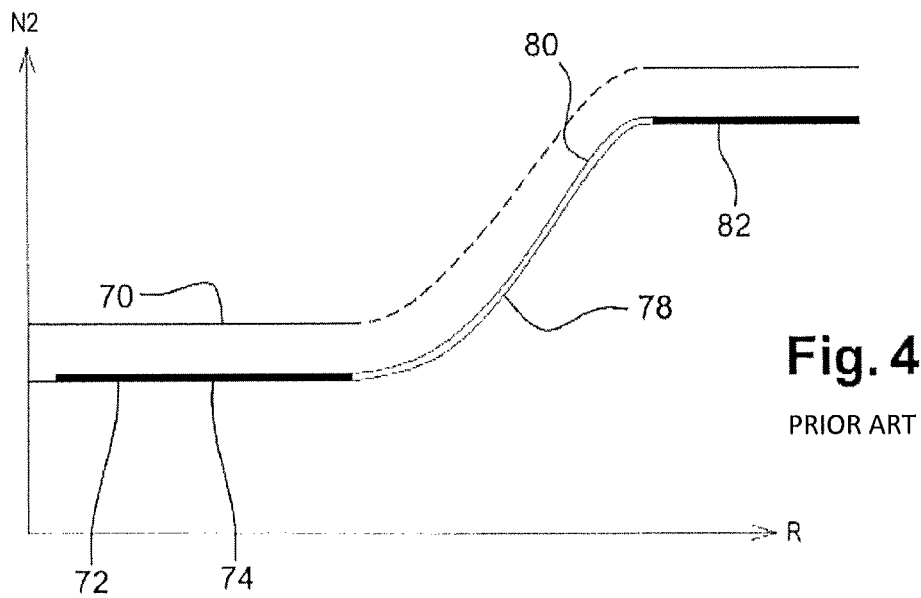
Figure 5:
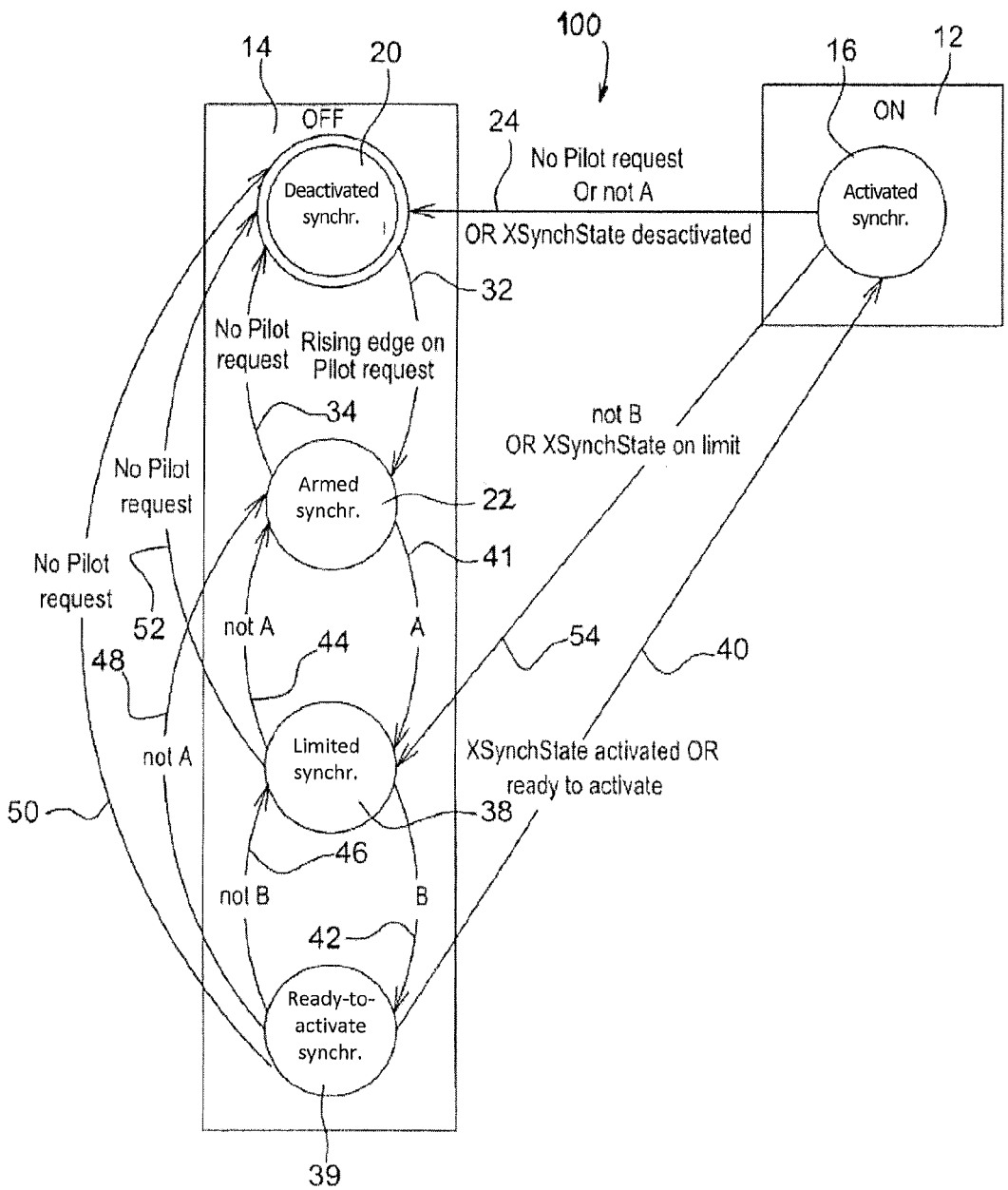

FIG. 4 is a very schematic graph of the prior art showing the evolution of the synchronization set values for the HP rotors of the engines of an airplane according to the speed of the engines; and FIG. 5 is a diagram showing the activation logic of the invention for synchronizing the rotors of the engines of an airplane making it possible, more particularly, to take the state of mutual synchronisation of the engines into consideration. Such logic is entered into each computer associated with each engine to be synchronized.

Figure 1:
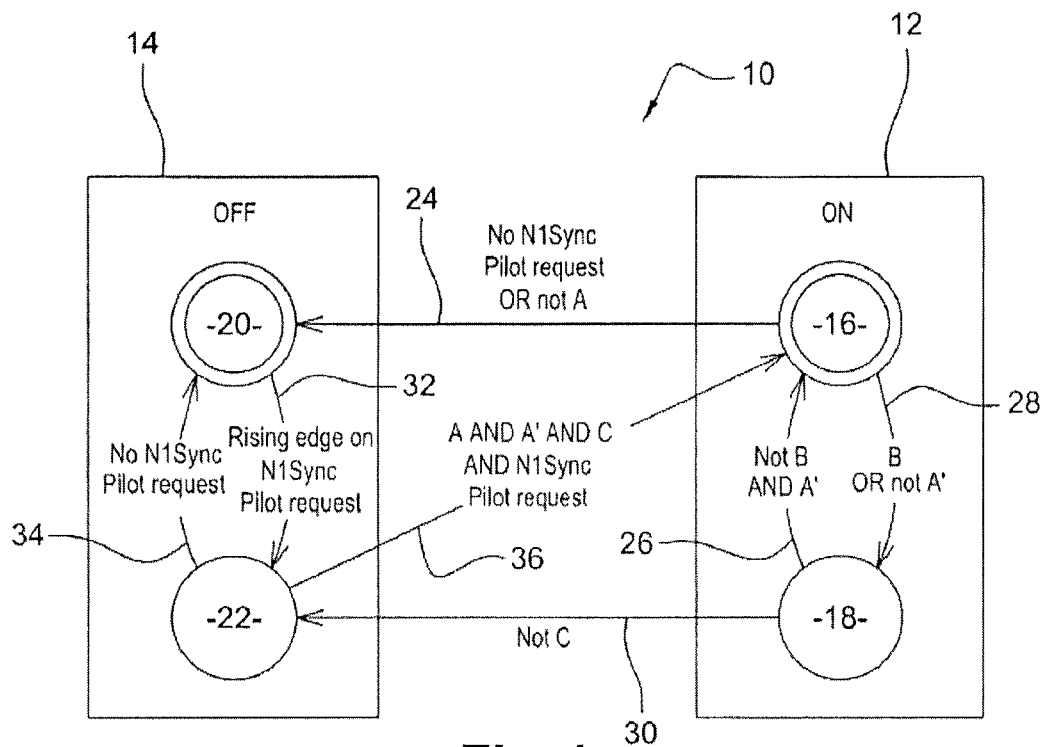
FIG. 1 is a diagram showing an activation logic of the prior art for synchronizing the rotors of the low pressure spools of the engines of an airplane.
Figure 3:
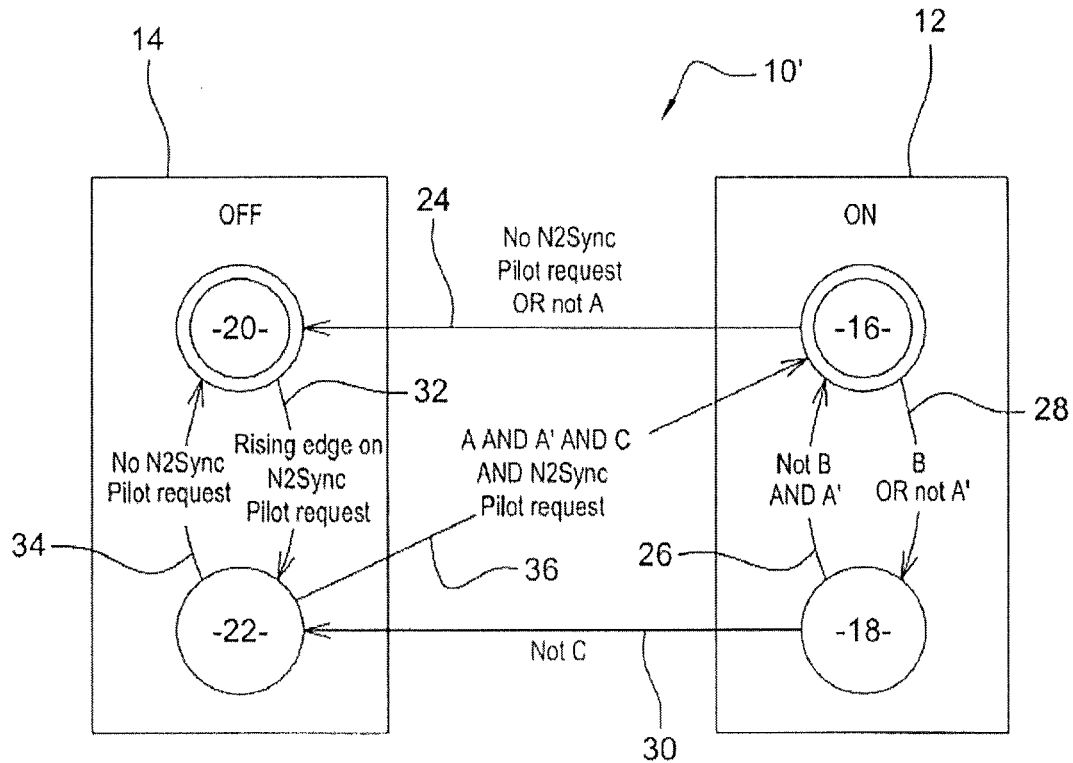
FIG. 3 is a diagram showing the activation logic of the prior art, too, for synchronizing the rotors of the high pressure spools of the engines of an airplane.

The diagrams of FIGS. 1 and 3 show activation logic 10, 10' of the prior art as per document WO2013/034839 for synchronizing the engines of an airplane, and in particular two-spool engines such as turbojets or turboprops. The diagram of FIG. 1 shows the activation logic 10 for synchronizing the rotors of the low pressure (LP) spools of the engines, whereas the diagram of FIG. 3 shows the activation logic 10' for synchronizing the rotors of the high pressure (HP) spools of the engines.

In each activation logic 10, 10', the synchronization may be in an ON mode (represented by the rectangle 12) or in an OFF mode (represented by the rectangle 14). In the example shown, the activation logic 10, 10' defines four synchronization activation states: two ON mode states (guaranteed activated state 16 and non-guaranteed activated state 18) and two OFF mode states (deactivated state 20 and armed state 22).

The arrows 24 to 36 show the possible switching from one synchronization state to another synchronization state, with some of such changes being automatic as soon as the conditions for applying synchronization change, whereas other changes require an activation order or a deactivation order to be given by the pilot of the airplane.

There are two types of conditions for applying synchronization: safety conditions intended to protect the engines and the airplane; and activation conditions intended to optimize the operation of the engines.

In the embodiment shown in the drawings, the activation logic 10, 10' comprises four conditions respectively referred to as A, A', B, and C. The A, A', B, and C conditions of the activation logic 10 for synchronizing the LP spools are not all identical with the conditions of the activation logic 10' for synchronizing the HP spools.

For synchronizing the LP spools (FIG. 1), the A conditions comprise an A1 activation condition and an A2 safety condition. The activation condition A1 is:

$$|\Delta N1dmd\_PWN| < 5\%,$$

which means that the difference between the speed set values N1 for the LP rotors of the engines (in absolute value) must be less than 5%. $\Delta N1$ represents the difference between the speeds of the LP rotors, "dmd" means that the set value for each engine is taken into consideration, and "PWM" means that this set value is specific to each engine and is calculated by a Power Management function in a computer of each engine (the function calculates the set values N1 according to the position of the controls and of other parameters). If the engines operate at too different LP speeds (A1>5%, for instance because the engine controls in the cockpit are in different positions, or because the set values are too different because the discrepancy between the N1 speeds of the engines is too great for the engines to produce the same thrust), then the A1 condition is not met. The discrepancy between the two original set values is monitored. Synchronization can thus be deactivated if the controls of the engines are in different positions (i.e. if they are distant from each other).

The A2 condition for the activation is no detection of a failure which could damage the engines or entail risks for the engines or the airplane and the passengers. As a mater of fact, since synchronization is a comfort function, no risk is taken and it is deactivated in case of an unwanted engine event (surge, overspeed, under- or over-thrust, etc.) or breakdown, in particular to prevent the correctly operating engine from behaving as the failing engine.

The A1 and A2 conditions are cumulative and both must be met for the A conditions to be considered as met.

As indicated by arrow 24, such A conditions have to be met for synchronization to be activated, i.e. for synchronization to be in the ON mode. If such A conditions are not met (or if the "not A" conditions are met), synchronization is automatically deactivated and switches from the ON mode (from the guaranteed activated state 16 or the non-guaranteed activated state 18) to the OFF mode (deactivated state 20). Such A conditions, which comprise both an A1 activation condition and an A2 safety condition, are thus necessary for activating synchronization, whatever the orders given by the pilot. Safety is thus preponderating over the comfort obtained by synchronizing the engines of the airplane.

As mentioned above, the A conditions comprise two cumulative A1 and A2 conditions. If one of them is no longer met, synchronization is deactivated, whether in the guaranteed activated or the non-guaranteed activated state. As a matter of fact, in case of an engine event or breakdown, the pilot must react and decide whether he/she wants to reactivate synchronization once the breakdown is cancelled. In case of different set values, the pilot is, a priori, responsible and therefor, he/she has to decide whether to reactivate synchronization or not.

As indicated on arrow 24, the switching from the activated (whether non-guaranteed 18 or guaranteed 16) state to the deactivated state 20 can also result from an order given by the pilot of the airplane who wants to deactivate synchronization ("No N1Sync Pilot request"). The "not A" and "No N1Sync Pilot request" conditions are not cumulative because of the OR. If either one of such conditions is met, synchronization may be deactivated.

The A' activation conditions comprise two A'1 and A'2 activation conditions, which are, respectively:

$$|N1dmd\_ctrl1 - N1sel1| < 5\%,$$

and $$|N1dmd\_ctrl2 - N1sel2| < 5\%,$$

whereby the difference between the set value (<<dmd>>, for "demand") and the measured value ("sel", for selected) of the N1 speed of each LP rotor (in absolute value) must be less than 5%. "ctrl" means that the current control set value, i.e. the common averaged set value, is taken into consideration, if the engines are synchronized. These conditions are met when both engines are running at stabilized speed and are thus not running at transient speed. On the contrary, the "not A" conditions are met when at least one of the engines is operating at transient speed.

Such conditions A' must necessarily be met in order to activate synchronization. When they are no longer met, however, synchronization is not necessarily deactivated, as explained below.

The B activation conditions are met if at least one of the engines is idling. These conditions are useful for switching from the guaranteed activated state to the non-guaranteed activated state, and vice versa, when the airplane is controlled by an idle loop and the controls are in the idling position.

As indicated by arrow 26, the activation logic switches from the non-guaranteed activated state 18 to the guaranteed activated state 16 if the above-mentioned A' conditions are met and the B conditions are not met (or if the "not B'" conditions are met). The activation logic switches from the guaranteed activated state 16 to the non-guaranteed activated state 18 if either one of these B conditions is met and the A' conditions are not met (or conversely, if the "not A'" conditions are met—arrow 28).

In other words, the activation logic switches from the non-guaranteed activated state 18 to the guaranteed activated state 16 if the engines are not idling and if the discrepancy between the set values and the measured values of the speed N1 in each engine is less than 5%.

By way of example, when the engines are operating at transient speed, the A' conditions are not met. The activation logic switches to the non-guaranteed activated state since deactivating synchronization would be useless, since control is no longer obtained via the N1 speeds. The fact that the N1 set speed is the set value specific to each engine or the common set synchronization is of little importance. When the A' conditions are met again, at the end of transient, synchronization will automatically return to the guaranteed activated state.

Figure 2:
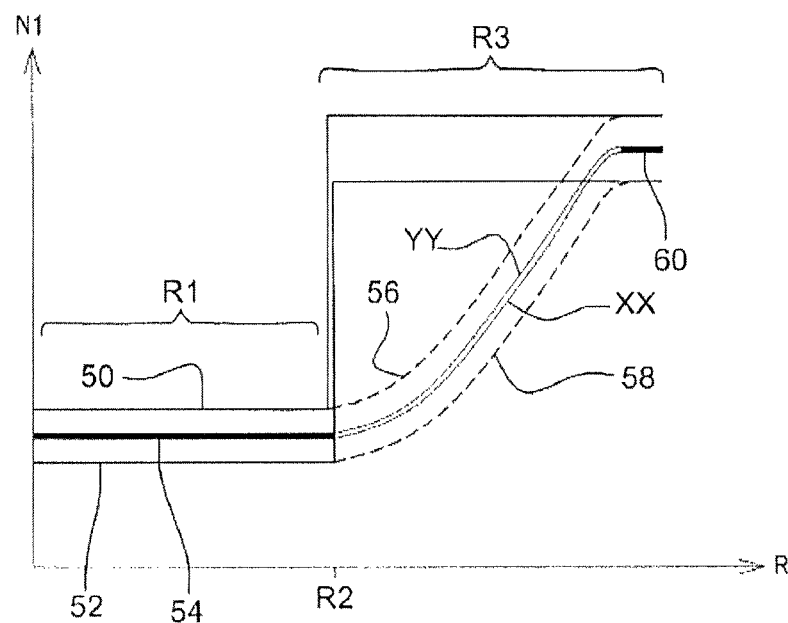
FIG. 2 is a very schematic graph showing the evolution of the synchronization set values for the LP rotors of the engines of an airplane according to the speed of the engines, in the prior art.

FIG. 2 shows the evolution of the N1 speed of the LP rotors of the engines of a plane when the speeds of the engines changes.

In the example shown, the airplane is provided with two engines only and the graph of FIG. 2 has two curves 50 and 52 representing the N1 set speed values specific to each engine, i.e. the set values that result from the positions of the controls as determined by the pilot of the airplane. The curves 50 and 52 have a stepped shape, each comprising a horizontal first portion representing a constant N1 set value since the R1engine speed is stabilized, with a vertical portion representing a change in the N1 set value since the R2 speed is transient, and a new horizontal portion representing a constant N1 set value since the R3 speed is stabilized again.

The change from the stable R1 speed to the R2 transient speed results from the pilot of the airplane moving the controls. As can be seen in FIG. 2, the N1 set values specific to each of the engines are slightly different in order to obtain the same thrust, even though the engine controls are in the same position. As a matter of fact, it can be noted that the two engines of a plane may run at slightly different speed to produce the same thrust.

The N1 set value for synchronizing the LP rotors is equal to the average of the N1 set values specific to each engine. The N1 speeds of the engines thus comply with this set value which is schematically represented by the bold continuous line 54 in FIG. 2, which is located between the curves 50 and 52 in the first horizontal portion mentioned above of such curves.

When the A' conditions are no longer met, i.e. when the engines are running at transient speed, the synchronization of the LP rotors switches to the non-guaranteed activated state. At transient speed, each engine is controlled by a set value for dN/dt that is integrated from the current rotor speed. Thus, the portions of the curves 56 and 58 show the evolution of the N1 speed of the LP rotor which each engine would have without synchronization: each engine starts from its current speed and follows two curves obtained by integrating their transient set values for dN/dt, which are very close. Now, the two engines were synchronized just before switching to transient. Upon switching to transient, they have almost the same current N1 speed for the LP rotor. The speeds thus follow two substantially identical curves 62 and 64, originating from two set values for dN/dt which are very close too, even though the engines are not technically running at the same synchronization set value. When the A' conditions are met again, the activation logic switches to the guaranteed activated state and the N1 speeds can comply with the common set value for synchronizing the LP rotors, which set value is equal to the average of the set values specific to the engines (bold continuous line 60 in FIG. 2).

The C activation conditions are met when the airplane is flying and is neither taking off nor climbing. Then the engine controls are not beyond the "Max Climb" position.

As shown by arrow 30, such C conditions have to be met to activate synchronization, i.e. for synchronization to be in the ON mode. When these C conditions are not met (or when the "not C" conditions are met), synchronization automatically switches from the ON mode (from the guaranteed activated state 16 or from the non-guaranteed activated state 18) to the OFF mode (armed state 22). The activation logic thus does not switch to the deactivated state so as to be automatically reactivated without the pilot reissuing an order.

An order from the pilot (N1Sync Pilot Request) is necessary to switch the activation logic from the deactivated state 20 to the armed state 22 (arrow 32) by depressing the corresponding button (N1Sync) in the cockpit.

The airplane cockpit has two synchronization activation buttons, a first button (N1Sync) for activating synchronization of the LP spools of the engines, and a second button (N2Sync) for activating synchronization of the HP spools of the engines. Each button can be in two positions, respectively ON and OFF. In the ON position, the button is depressed and lighted, whereas in the OFF position, it is out and the light is off. The pilot cannot request synchronization of both engine spools simultaneously. If the pilot presses the first button to depress it while the second button is already in the depressed position, then the second button is automatically disengaged to return to the out position.

The pilot order (N1Sync Pilot Request) thus requires pressure to be applied onto the button N1Sync in order to depress it and put it in the ON position.

Another pilot's order (No N1Sync Pilot Request) is required to switch the activation logic from the armed state 22 to the deactivated state 20 (arrow 34), by pressing once more the button N1Sync so that it returns to the out or OFF position.

As explained above, a pilot's order (no N1Sync Pilot Request) may be required for switching the activation logic from the activated state to the deactivated state (arrow 24). This pilot order likewise requires the button N1Sync to be pressed so as to put it in the out or OFF position.

When the switching of the activation logic from the activated state (16 or 18) to the deactivated state 20 results from the A conditions not being met (arrow 24), the activation logic is in the deactivated state whereas the N1Sync button is still in the depressed or ON position. In order to arm synchronization (arrow 32), the pilot has to press twice the button first to disengage it, and then to re-engage it. As a matter of fact, the logic of the invention needs to detect a rising edge following the pilot's order so as to switch the activation logic to the activated state.

The arrow 36 represents the switching of the activation logic from the armed state 22 to the activated state 16. The A, A', and C conditions must be met in order to activate synchronization. It is also necessary for the N1Sync button to be in the ON or the depressed position, which means that the pilot has already given the order to activate synchronization (N1Sync Pilot Request). These conditions are cumulative and they must therefore all be met to activate synchronization.

As a result, no pilot's order is required to confirm and activate synchronization when the N1Sync button is in the ON or depressed position and the activation logic has switched to the armed state 22 since the C conditions are no longer met (arrow 30). However, as marked on arrow 32, a pilot's order is required to re-arm synchronization which has switched to the deactivated state since the A conditions are no longer met (arrow 24). Reactivation of synchronization is thus automatic under certain circumstances only, thus making it possible to improve the performance of the engines and to provide the engines and the airplane with protection.

As regards the synchronization of the HP spools (activation logic 10' in FIG. 3), the A conditions comprise two A1 and A3 activation conditions and one A2 safety condition. The A1 and A3 activation conditions are as follows:

$$|\Delta N1\text{dmd}| < 5\%,$$

and $$|\Delta N2\text{sel}| < 5\%.$$

whereby the discrepancy between the set values ("dmd") for the speed of the LP rotors of the engines (in absolute value) must be less than 5%, and the discrepancy between the measured values ("sel") for the speed of the HP rotors of the engines (in absolute value) must be less than 5%. $\Delta$N1 represents the discrepancy between the speed of the LP rotors and $\Delta$N2 represents the discrepancy between the speed of the HP rotors. In order to synchronize the HP spools, one engine is referred to as the master engine and the other one is referred to as the slave engine. The slave engine takes the measured HP speed of the other engine as its new HP set speed. Differentiating the "N1dmd_PWM" set value from the "N1dmd_ctrl" set value is not necessary since the N1 set speed is not modified by synchronization.

The additional A3 condition makes it possible to deactivate synchronization if the discrepancy between the two N2 measured speeds is less than 5%. This has to be checked because of the nature of the type of synchronization wherein the set value for the slave engine is the measure of the other engine. This avoids excessive thrust rises upon activating/deactivating synchronization, on the one hand, and above all this avoids the risk of a master engine failing or being affected by an undetected engine event, which might extend to the correctly operating slave engine.

The A2 activation condition remains the absence of detection of a failure which might damage the engines or generate risks for the engines or the plane and the passengers.

The A1, A2, and A3 conditions are cumulative and must all be met for the A conditions to be considered as met.

Similarly to the synchronisation of the LP spools of the engines, the synchronisation of the HP spools switches from the activated (guaranteed 16 or non-guaranteed 18) state to the deactivated state depending on the results of the A conditions checking (arrow 24).

As indicated on arrow 24, the switching from the activated state 16, 18 to the deactivated state 20 may result from an order transmitted by the pilot of the airplane who wishes to deactivate synchronization ("No N2Sync Pilot request") by pressing the N2Sync button to put it in the out or OFF position.

The A' activation conditions comprise two cumulative A'1 and A'2 activation conditions, which are respectively:

$$|N1\text{dmd}1 - N1\text{sel}1| < 5\%,$$

and $$|N1\text{dmd}2 - N1\text{sel}2| < 5\%$$

meaning that the differences between the set value and the measured value for the N1 speed of each LP rotor (in absolute value) must be less than 5%.

FIG. 4 shows the evolution of N2 speed of the HP rotors of the engines on a plane when the engine speed changes.

The curves 70, 72 represent the N2 set speed specific to each engine, each comprising a first horizontal portion for which the N2 set speed is constant during a R1 stabilized speed, a sloping portion for which the N2 set speed increases during a R2 transient speed, and a new horizontal portion for which the N2 set speed is constant for a R3 stabilized speed.

The positions of these curves 70 and 72 relative to each other make it possible to identify the master engine for synchronizing the HP spools. The master engine is the engine having the HP spool rotating at the lower N2 speed in order to deliver a given thrust, i.e. the one corresponding to the curve 72 in FIG. 4.

The N2 set value for synchronizing the HP rotors is equal to the set value specific to the master engine, i.e. to the set value corresponding to the curve 72. This N2 set value is schematically shown by the bold continuous line 74 in FIG. 4 which is located on the curve 72 in the above-mentioned horizontal first portion of this curve.

With a transient speed, the synchronization of the HP rotors switches to the non-guaranteed activated state. Similarly to the synchronisation of the N1 speeds, the N2 speeds of each engine follow paths 78 and 80 which are substantially identical since they originate from close dN/dt set values, which are integrated from the same initial value. When the speed is stabilized again (R3), the activation logic switches to the guaranteed activated state and the N2 speeds take the N2 set value for synchronizing the HP rotors, which is equal to the set value specific to the master engine (bold continuous line 82 in FIG. 2).

The B and C activation conditions of the activation logic 10' for the HP spools of the engines are identical with those described above as regards the activation logic 10 for the LP spools of the engines.

The invention is applicable to synchronizing two, three, four, or even more engines on the same plane. When synchronizing the LP spools of two-spool type engines, the synchronization N1 set values may be equal to the average of the N1 set values specific to the various engines. As regards the synchronisation of the HP spools of the engines, the N2 set values for synchronisation are preferably the set values specific to one of the engines considered as the master engine, with the other engines being considered as the slave engines intended to comply with the behaviour of the master engine (it being specified that, in this embodiment, rotational speed parameters are taken into consideration, but that other engine parameters, such as fuel flow rate, pressures in the combustion chamber and/or differences—or a ratio—in/of pressure between the inlet and the outlet of the compressors stage.

In any case, when at least two engines of the airplane are concerned by synchronization, and as mentioned above in the description, it may be desirable to avoid only one engine being activated, since this could affect the synchronization and possibly the proper operation of the engines.

FIG. 5 shows a solution provided by the invention of proper logics 100 for activating the synchronisation of the engines on a plane. This case is more particularly suitable for synchronizing the rotors of the high pressure or low pressure spools in the engines of the airplane.

In FIG. 5, the references used are the same as those in FIGS. 1 and/or 3, when the states or the switching from one state to another match or are different. The differences between the various solutions will thus be explained hereafter.

FIG. 5 shows no other state than the (fully) activated state 16 wherein synchronisation is activated (refer to state 18 of FIG. 1 or 3, which thus aimed at remaining activated even at transient speed—when accelerating or decelerating—or with idle speed.

This evolution more particularly results from the fact that, at transient speed, the deviation between the set value N1 and the measure N1, as regards the A' condition was soon activated, and the logics thus remained in this state 18 for a very short time.

In addition, it has been decided to take into consideration the state of the function of synchronisation of the various flight propulsion engines on a plane, so as to make sure that one engine cannot be activated only, and that, if one is deactivated, the other will also be deactivated, it being specified that, hereinunder, when mention is made to the switching of <<the>> activation logic from one state to another state, this is true for one engine, with each engine computer storing such activation logic and data being exchanged between the computers.

Therefor, for each engine, the activation logic will automatically switch from the armed state 22 to the activated state 16 via, in a sequence, a first 38 and then a second 39 intermediate states of the activation logic, whether the LP (N1Sync) or HP (N2Sync) spools of the engines are synchronized.

Prior to, or upon every activation logic switching from the second intermediate state 39 to the activated state the following will take place:

taking into consideration, on each engine, the activation state of the synchronisation, and exchanging said data between the engines, The ARINC digital connection can be used by the engines for exchanging data relating to the state of the synchronisation logic which concerns same. Details are given hereunder.

Any switching (arrow 40) of the activation logic from the second intermediate state 39 to the activated state 16, will thus depend, for each engine, on whether it is in the state 16 or 39, and such data will be exchanged between the engines.

In the absence of the above-mentioned condition for an exchange, (i.e. taking into consideration the situation of all the concerned engines), when the engines are synchronized and one of these has a problem but, the activation condition for same engine is lost prior to the failure being detected, during an automatic periodical checking, synchronization will be deactivated for the failing engine only. In this case, the synchronisation of the other engine will be pending. Although this does not raise any problems as regards operation, the display available to the pilot will differ depending on the engines, which may be destabilising.

A priori, the switching to such second intermediate state 39 will be transient for software; it will quickly change, with the synchronisation being simultaneously activated for both engines (switching 40) if, as mentioned in FIG. 5, the other one(s) is/are, at the same time:

in said second intermediate state 39 (ready-to-activate condition);

or in the synchronization activated state 16 ("XsyncState activated" condition).

If, with the activation logic having switched to the activated state 16 on all engines, (preferably only the) activation conditions (B conditions in FIG. 5, thus, preferably apart from the safety conditions) are no longer met for (at least one of the) engines or the data relating to the activation state of the synchronisation of such engine sent to the other engine(s) through digital connections state that the activation logic thereof is in the first intermediate state 38, whereas the activation logic of the other engine(s) is in the activated state 16, then it is further recommended that the activation logic of such other engine(s) should automatically switch back from such activated state 16 to the first intermediate state 38; refer to line 54.

So, in such first intermediate state 38, synchronisation will no longer be activated, unlike in the situations of the FIGS. 1, 3 wherein the state 18 aimed at leaving the synchronisation activated when the engines are running at transient speed (when accelerating or decelerating) or at idle speed.

Now, it turned out that, at transient speed, the condition of discrepancy between the N1 set value and the N1 measured speed in the A' condition could activate within a very short time, so that the activation process remained in such state for a very short time.

Besides, at idle speed, when the synchronisation of the LP spools of the engines (N1Sync) was in the activated mode, with the first above-mentioned button engaged, when two engines are concerned, one increases its N1 speed and the other one reduces it, since it is typically preferred to take the average set value as the common set value. The engine which has to reduce its speed will never be able to switch to idle speed, and it is thus advantageous to select, as (at least one of) the B activation condition(s) (beside safety), the one when the engines run at a speed higher than the idle speed.

In the N2Sync mode (with the second above-mentioned button engaged), the idle speed is possible if the slave engine is led to increasing its rotational speed only. At a speed below the idle speed, synchronisation is not possible either: in practice, the engine will run on another operation management loop with a higher priority.

Informing the pilot that synchronisation cannot be activated thus appears necessary. The non-guaranteed activated state 18 has thus been eliminated from the solutions of FIGS. 1, 3 in favour of the second intermediate state 39, which is thus one of the deactivated (OFF) modes 14.

That being completed, the selected logics provides:
that the switching of the activation logic of one of the engines to the guaranteed activated state 16 (arrow 40) requires that all the safety and activation conditions of the other engine(s) are met,
that, if one of the engines switches to the deactivated state (arrow 24), then the other engine(s) will also automatically switch to same state, and
that, for each engine, the activation logic automatically switches (41, then 42) from the armed state to the first 38 and then to the second 39 intermediate state when said first portion and then said second portion, different from the first one, of the safety and/or activation conditions are met.

As mentioned in FIG. 5 again, if A and then B conditions are met, and thus correspond to such first and second parts of the conditions, respectively, the automatic switching 41, then 42 may be authorized.

On the contrary, if such, here B and then A, conditions are not met (<<NOT B>> and <<NOT A>> respectively), this will cause the automatic return 46, 44 from the second intermediate state 39 to the armed state 22.

So, if the periodical checking of the safety and activation conditions states that:
said second portion of the conditions required for reaching the state 39 is no longer met for at least one of the engines, whereas the activation logic is in the second intermediate state 39, the activation logic switches to the first intermediate state 38 (refer to line 46),
said first portion of the conditions is no longer met for at least one of the engines, whereas the activation logic is in the first intermediate state 38, said activation logic then switches to the armed state 22 (refer to line 44).

Rather than those mentioned above in connection with FIG. 1 or 3, it is confirmed that it is more advantageous, for safety:
for the A conditions, to be safety conditions only (which may concern requirements for the N1 and N2 speeds and the A2 condition, mentioned above),
and for the B conditions, to be activation conditions only (which may concern the N1 and N2 speeds again, and the C condition mentioned above: the plane is flying and is neither taking off nor climbing).

As regards the switching conditions 24, 32, 34 of the solution of FIG. 5, they remain as they are in FIG. 1 or 3, with this difference that, as regards the switching 24, the <<Xsynch=deactivated>> safety condition is added, which corresponds to the data according to which at least one of the engines lost at least one of its general activation conditions, and that the data exchanged between the engines therefore must switch the activation logic (of all the flight engines) to the deactivated state 20.

As shown in FIG. 5, too, this condition is preferably an alternative to the above-mentioned "NOT A" and "No Pilot request" condition relating to a control instruction transmitted over the piloting bus by the pilot for deactivating synchronization.

As shown in FIG. 5, and with a view to making the operation safer and more reliable, if the periodical checking of the safety/activation conditions states that said first portion of the conditions (preferably the safety portion thereof) is no longer met for at least one of the engines, when the activation logic is in the second intermediate state (39), said activation logic will preferably switch to the armed state 22 (refer to line 48).

With the same safety-based approach, specifically, if the step of the first intermediate state 38 is accessible, from the armed state 22, only when all safety conditions are met, it will be preferred for the pilot to be:
able to directly switch the activation logic from the second intermediate state 39 to the deactivated state 20 (refer to line 50), by giving a first deactivation order, and/or
able to directly switch the activation logic from the first intermediate state 38 to the same deactivated state 20 (refer to line 52), by giving a second deactivation order.

More generally, it is considered as desirable that the pilot should be able to act at each step of the synchronisation, so that, in addition to the above-mentioned possible action on line 24, switches (respectively 52, 50, 34) of the activation logic from any one of the first intermediate state 38, second intermediate state 39 and armed state 22, to the deactivated state 20, take place when a deactivation order is given by the pilot, by the latter pressing a button, for instance.

Figure 6:
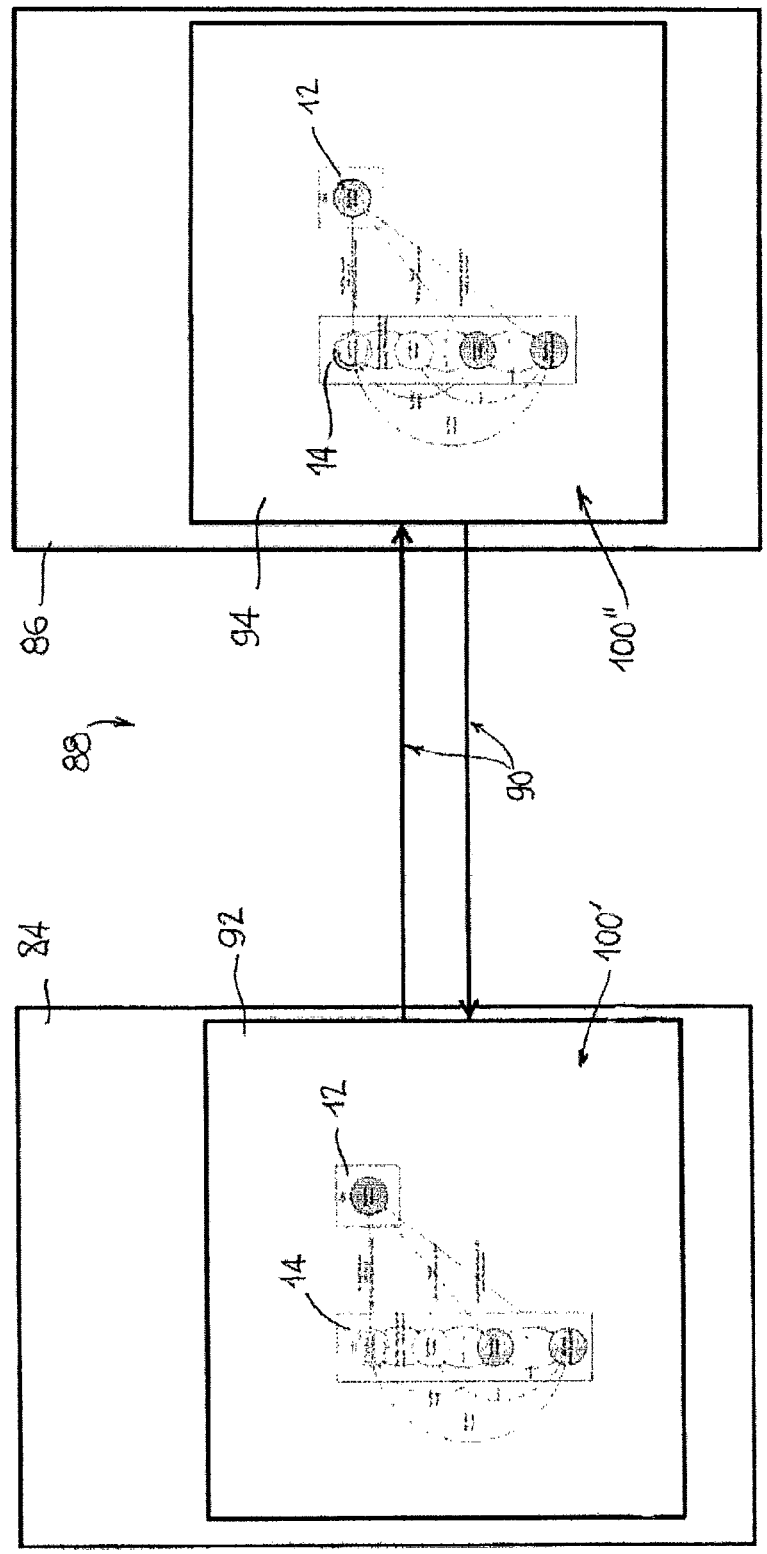

FIG. 6 schematically shows an architecture enabling the implementation of the synchronizing method above.

It is assumed here that two engines 84, 86 of an airplane 88 have to be synchronized using the same duplicated activation logic.

The two engines 84, 86 will typically be those respectively on the left and on the right of the fuselage, most of the time under the plane wings, even though some engines are positioned along the fuselage and attached thereto, on either side thereof. A solution is possible for more than two engines, specifically two per wing, or one per wing plus a third, central, one, at the back, above the fuselage (like the DC10, for instance).

As already mentioned, a digital bus, reference 90 here, such as ARINC digital connection, will make it possible for the engine(s) (computers) to exchange data relating to the state of the synchronisation logic they are concerned with.

The computer (respectively 92, 94) of each engine, here the first 84 engine, and the second 86 engine, will thus be provided with engine synchronisation activation logic, respectively 100', 100". Each logic 100', 100" is of course a replica of the general logic 100 disclosed in details above. This is confirmed by FIG. 6; besides the elements 12 and 14 mentioned above can be found in each logic contents.

Each logic 100', 100", and the associated synchronisation function thereof (i.e. as a reminder, the function of synchronising the low pressure (LP) or high pressure (HP) spools of the double-spool engines on a plane to reduce the vibrations felt in the cabin and noise, will be contained in the computer aboard the engine concerned. Here, the logics 100', 100" have been loaded (coded) into the EEC computers respectively associated with the engines 84,86. And the digital bus 90 provides for the exchange of data between the computers 92, 94, specifically that relating to the activation state of each engine.

If the logics 100', 100" have thus identical structures (encoding), the data contained therein may of course be different, since the activation state can, a priori, be different, at a given moment, in each engine, and since the taking into consideration of the activation state of the other engine whether exchanged, or transmitted through the digital connection 90, enables making sure that the activation state of each engine will be identical at any time, i.e. as already mentioned (for each engine):
  the switching (40) of the activation logic to the activated state requires the safety and activation conditions applied to the other engine(s) should all be met,
  if the activation logic one of the engines switches to the deactivated state (20), the activation logic of the other engine(s) should automatically do so as well; and
  the switching (41, 42) of the activation logic from the armed state to the first and then to the second intermediate state takes place automatically when a first portion and then a second portion, different from the first one, of the safety and/or activation conditions should be met.

Figure 7:
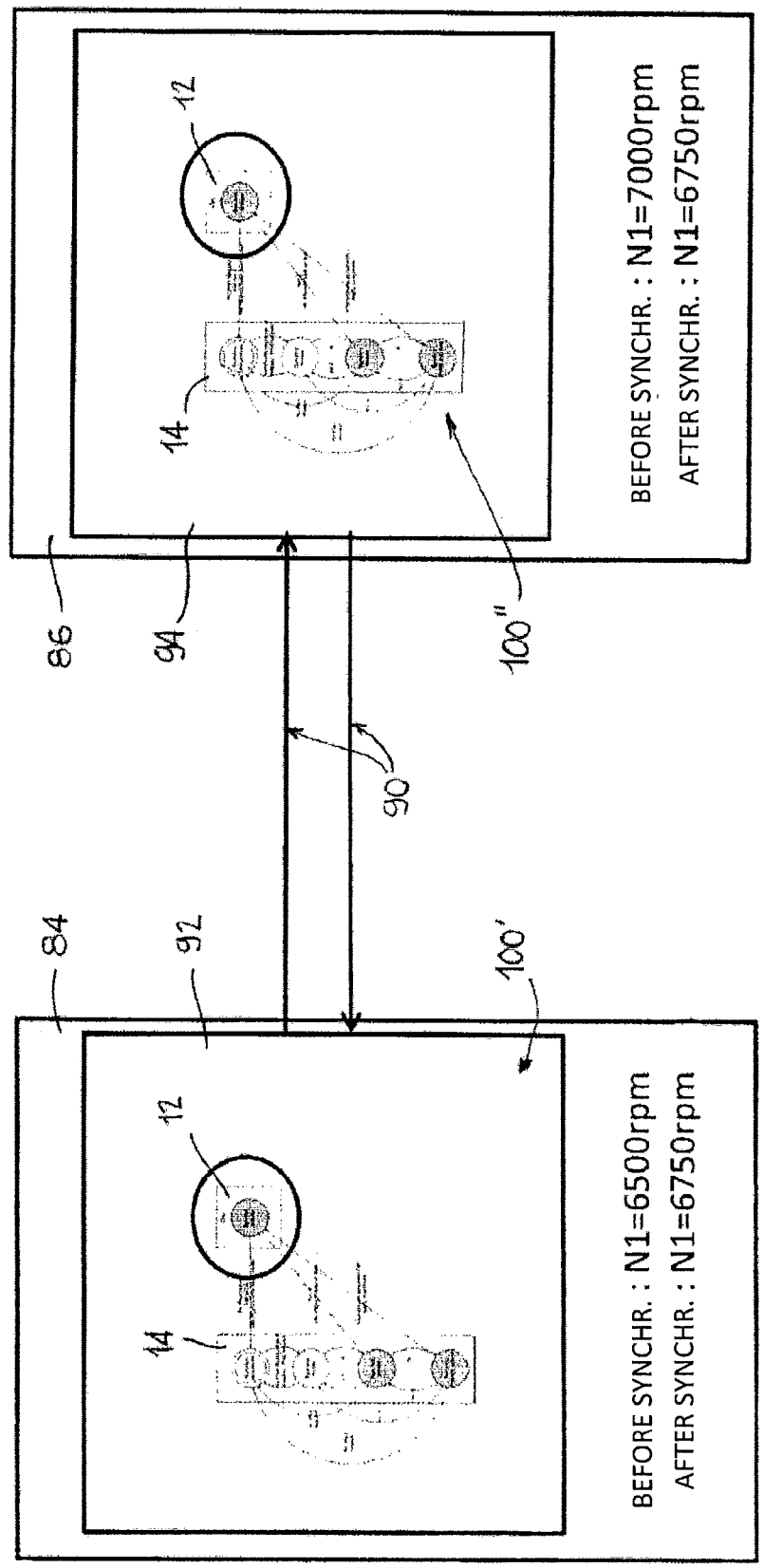

FIG. 7 gives an example of what happens then, i.e. with the common logic of FIG. 5, if the pilot (via a depressed button, for instance) gives an order to synchronize the N1 speed of the engines, such as 84 and 86.

The order is transmitted (from the depressed button) via a suitable electric connection, up to the computers 92, 94) which analyse the respective situations of the logics 100', 100" and interexchange, via the digital bus 90.

Let us assume that, prior to the pilot's request, i.e. prior to synchronisation, the N1 speeds of the engines 84 and 86 respectively be N14=6,500 rpm and N16=7,000 rpm (radians/min.).

As mentioned above, the N1 speed set for the synchronisation of the LP rotors may be equal to the average of the N1 set values specific to the engines (refer to FIG. 2, the information of which then applies: thick continuous schematic line 54-60 located between the curves 50 and 52 and the extensions thereof).

Figure 8:
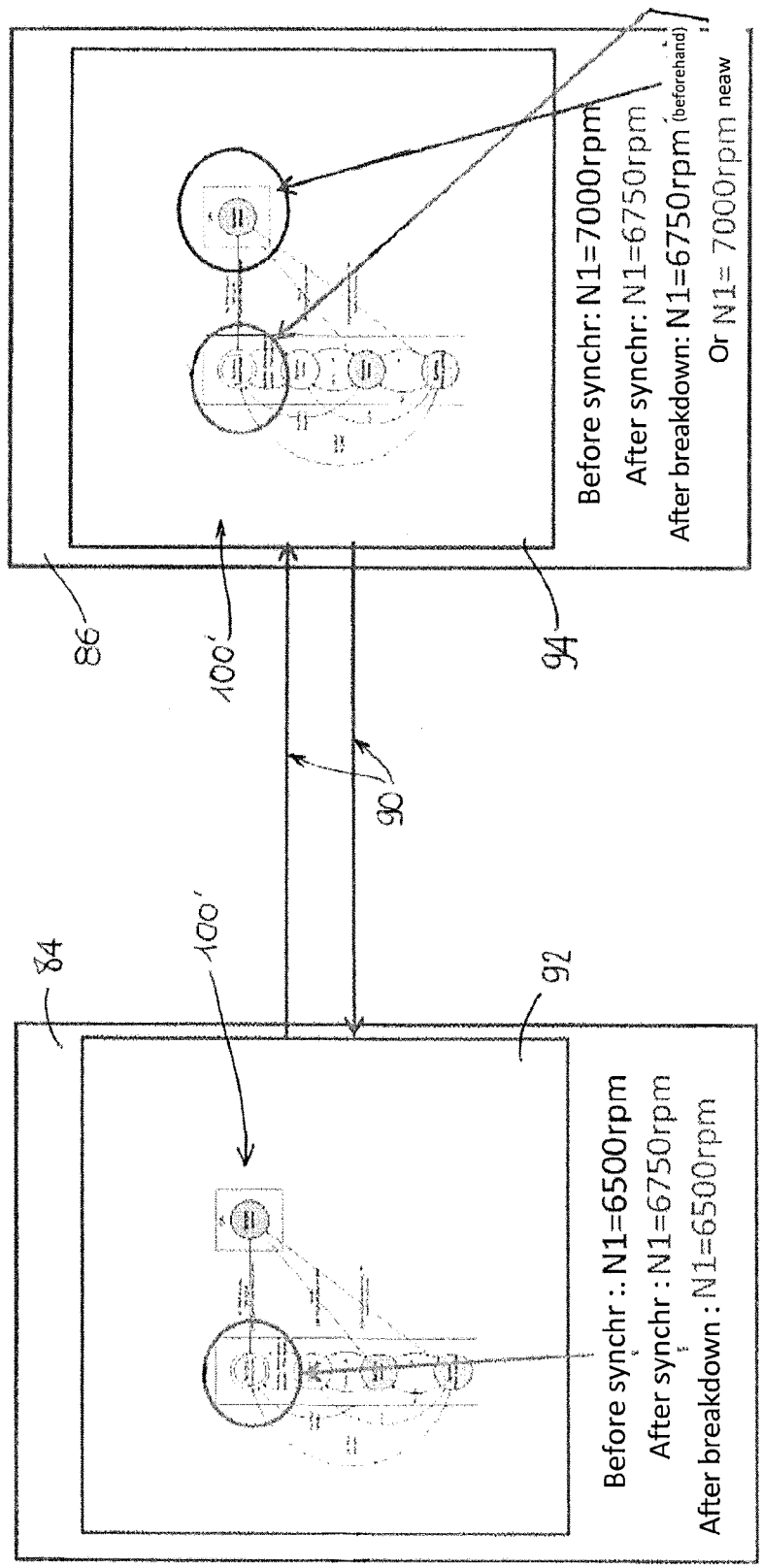

If all the conditions are met (refer to the above-mentioned conditions), each engine switches to the activated state and selects, as the new set value, the arithmetical average of the two set values: after synchronisation, in case of confirmation by logic 100, 100', 100": Common N1=6,750 rpm Let us assume now that the engine 84 fails when the engines 84, 86 are synchronized, like the example hereunder. This is the case illustrated in FIG. 8 which is a diagram of the behaviour of such engines which takes account of the behaviour of the activation logic 100', 100" thereof.

If such failure occurs in the engine 84, the synchronisation activation logic 100' will deactivate such function in the engine. The engine 84 then returns to its rotation speed prior to synchronisation (here N14=6,500 rpm).

Previously, if the activation state of synchronisation had not been taken into consideration for the engine 84 (as in the solution provided in WO2013/034839), the engine 86 would have remained activated and would have continued operating at the average speed mentioned above (here common N1=6,750 rpm).

Thanks to the improvement provided in the invention, and thanks to the exchange or transfer of information from one engine to the other one, the engine 86 is <<deactivated>> too, so long as its logic 100" receives data relating to the fact that the logic 100' switched to another state than activated (16). The engine 86 then returns to its rotation speed prior to synchronisation (here N16=7,000 rpm).

The situation thus becomes: N14=6,500 rpm and N16=7,000 rpm. The rotation speeds N1 of the engines are thus no longer synchronized.

The invention claimed is:

1. A method for synchronising there between engines of an airplane by an electronic chip encoding at least one activation logic per engine, the activation logic being intended to check the safety and/or activation conditions in order to apply the synchronisation, with each activation logic defining synchronization states of the engines, including at least a deactivated state, an armed state, and an activated state, with the method comprising, per engine:
  receiving, with the electronic chip, an activation order;
    when the activation order is issued by a pilot of the airplane and received with the electronic chip, switching the activation logic encoded on the electronic chip from the deactivated state to the armed state;
    periodically checking, with the activation logic encoded on the electronic chip, at least one of the safety and activation conditions relative to said states, in order to define whether said conditions are met or not met,
    switching the activation logic encoded on the electronic chip from the armed state to the activated state when some of the safety and/or activation conditions are met;
  receiving, with the electronic chip, a deactivation order; and
    when the deactivation order is issued by the pilot and received with the electronic chip or when some of said safety conditions are not met, switching the activation logic encoded on the electronic chip from the activated state or the armed state to the deactivated state,
  wherein:
    switching the activation logic encoded on the electronic chip from the armed state to the activated state is carried out via a first and then a second successive intermediate state of the activation logic encoded on the electronic chip,
    every instance of switching the activation logic encoded on the electronic chip from the second intermediate state to the activated state involves exchanging such data between the engines carried out by an exchange digital link, so that:

switching the activation logic encoded on the electronic chip of one of the engines to the activated state requires that the safety and activation conditions applied to the other engine(s) are all met, and if the activation logic encoded on the electronic chip of one of the engines switches to the deactivated state, the activation logic encoded on the electronic chip of the other engine(s) automatically does so as well; and for each engine, switching the activation logic encoded on the electronic chip from the armed state to the first and then to the second intermediate state takes place automatically when a first portion and then a second portion, different from the first one, of at least one of the safety and activation conditions are met.

2. The method according to claim 1, wherein switching the activation logic encoded on the electronic chip from the second intermediate state to the activated state takes places on one of the engines if the activation logic of the other engine(s) is(are) in said second intermediate state or in the activated state.

3. The method according to claim 1, wherein after the electronic chip receives an order from the pilot, the activation logic encoded on the electronic chip switches from the second intermediate state to the deactivated state.

4. The method according to claim 1, wherein if periodically checking, with the activation logic encoded on the electronic chip, at least one of the safety/activation conditions states that said second portion of the conditions is no longer met for at least one of the engines, or if the data relative to switching to the activated state of the activation logic encoded on the electronic chip of such motor sent to the other engine(s) through said exchange digital link states that the activation logic encoded on the electronic chip thereof is the first intermediate state, whereas the activation logic encoded on the electronic chip of the other engine(s) is the activated state, the latter switches to the first intermediate state.

5. The method according to claim 1, wherein if the step of periodically checking states that said first portion of the conditions is no longer met for at least one of the engines, when the activation logic encoded on the electronic chip is in the first intermediate state, said activation logic encoded on the electronic chip switches to the armed state.

6. The method according to claim 1, wherein switching the activation logic encoded on the electronic chip from any one of the first intermediate state and second intermediate state to the deactivated state takes place when the electronic chip receives the deactivation order issued by the pilot.

* * * * *